Nov. 26, 1957 A. WHARTON 2,814,683

PULSING TIMER

Filed May 18, 1954 2 Sheets-Sheet 1

INVENTOR.
ARMISTEAD WHARTON

BY Francis E. Blake

ATTORNEY

Nov. 26, 1957 A. WHARTON 2,814,683
PULSING TIMER
Filed May 18, 1954 2 Sheets-Sheet 2

*INVENTOR.*
ARMISTEAD WHARTON
*BY* Francis E. Blake
*ATTORNEY*

2,814,683

PULSING TIMER

Armistead Wharton, Rochester, N. Y., assignor, by mesne assignments, to General Dynamics Corporation, a corporation of Delaware Application May 18, 1954, Serial No. 430,548

18 Claims. (Cl. 200—38)

The present invention relates to timing devices.

There are various types of relatively complex timing devices used in many different applications for controlling or recording events in accordance with the passage of time. The timing device of the present invention has been specifically developed for use in automatically timing telephone calls in order that the information relating to the duration of a telephone call may be recorded in automatic toll call ticketing apparatus. However, the timing device of this invention may be used for other timing functions and it is not intended that this invention be limited to any particular use.

For timing the duration of a telephone call, it may be satisfactory to record the duration of the call by discrete electrical impulses regularly recurring at sixty-second intervals. Such timing apparatus must be instantly resettable at the end of each call to a reset starting position ready to commence the timing of a succeeding call. Under some conditions of operation, when using the timer with automatic dial systems and automatic toll ticketing apparatus, it may be desirable to arrange that the time interval from the instant that the timer is started from the reset or starting position to the instant that the first electrical pulse is generated is slightly greater than each of the succeeding time intervals between electrical pulses occurring at the end of regularly recurring time intervals. The longer first timed interval thus obtained thereby provides a period of grace in order that the calling party may be assured that he has been connected with the desired called party.

It is a principal object of the present invention to provide a simple and effective timing device, the timing device being instantly resettable at any time for beginning a subsequent timing operation.

Another object of this invention is to provide a resettable timing device adapted to produce an electrical impulse by momentarily operating a pair of electrical contacts in response to a characteristic movement occurring at the end of regularly recurring time intervals.

Yet another object of the invention is to provide a resettable timing device adapted to produce a characteristic momentary movement or momentarily close electrical contacts at the end of regularly recurring time intervals by an arrangement such that the first time interval is somewhat longer than each of the succeeding time intervals.

Briefly described, the timing device of the subject invention is comprised of a timing cam adapted to be moved in a first direction by a suitable clock train, either electrical or mechanical, which is connected to move the cam through any suitable clutch device. The timing cam is provided with a generally ratchet shaped cam surface including at least one first section gradually diverging outward from an inner reference position in a direction opposite to the first direction of movement of the cam by the clock train. The outer end of each first section connects with a second peripheral section extending abruptly inwards substantially normal to the first section, and the inner end of each second section connects with an inner end of a first section. There may be one or more ratchet cam portions comprising the first and second cam sections referred to above, and in all cases, each cam portion will be substantially identical to the other cam portions. Cam follower means comprising a lever arm is pivotally mounted with its free end urged by resilient means into engagement with the cam surface of the timing cam. The arrangement is such that, as the cam is moved in the first direction by the clock train, the lever arm will be gradually moved outward in a first direction as its free end engages a first cam section of the timing cam. When the free end of the lever arm engages a second cam section of the timing cam, the lever arm moves rapidly inward in a second direction that is the reverse of the first direction thereby producing a characteristic momentary mechanical movement of the cam follower lever arm at the end of regularly recurring timing intervals as the timing cam is moved by the clock train.

Whenever the clutch is operated to declutch the clock train from the timing cam, the free end of the lever arm, in response to the aforementioned resilient connection, acts to move the cam backwards in a second direction that is the reverse of the first direction of cam movement due to the camming action of the free end of the lever arm against the gradually sloping first cam section. The reverse movement of the cam will be arrested at the time that the free end of the lever arm engages the conjunction of the inner ends of any first and second cam sections. The arrested position of the timing cam is thereby equivalent to a known reset or starting position for a subsequent timing operation. With the timing structure described above it is possible to provide that the interval of time during which the cam is moved from the reset or starting position to the position at which the lever arm is characteristically moved in the second direction may be made of slightly greater duration than the time interval between succeeding characteristic movements of the lever arm. Such operation may be obtained by providing a recessed or indented cam portion at the conjunction of the inner ends of first and second cam sections such that when the cam is reversely moved by the cam action of the lever arm it will be moved to a position with the end of the lever arm received in the indented portion. Thus, with such an arrangement, the movement of the cam in the first direction from the reset or starting position will require the free end of the lever arm to engage the first cam section for a somewhat longer interval of time before reaching the second cam section. Thereafter, a continued movement of the timing cam will require the lever arm to engage a first cam section for a somewhat shorter time interval since the timing cam has already been moved to a position such that the end of the lever arm will not be received in the indented configuration.

The characteristic movement of the lever arm in the second or reverse direction, as described above, may be employed to operate electrical contacts and thereby produce a momentary electrical impulse during each rapid characteristic movement of the lever arm.

Further objects, features, and the attending advantages of the invention will be apparent from the following specification and drawings in which.

Figure 1:
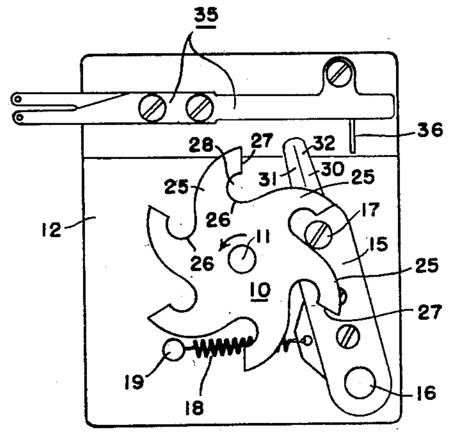
Fig. 1 is a top plan view.
Figure 3:
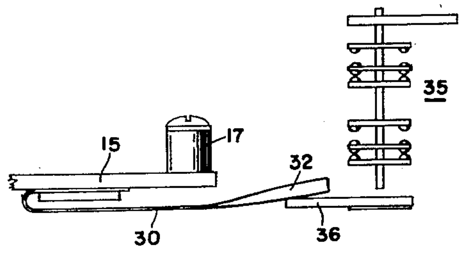
Figures 2, 4, 5, 6:
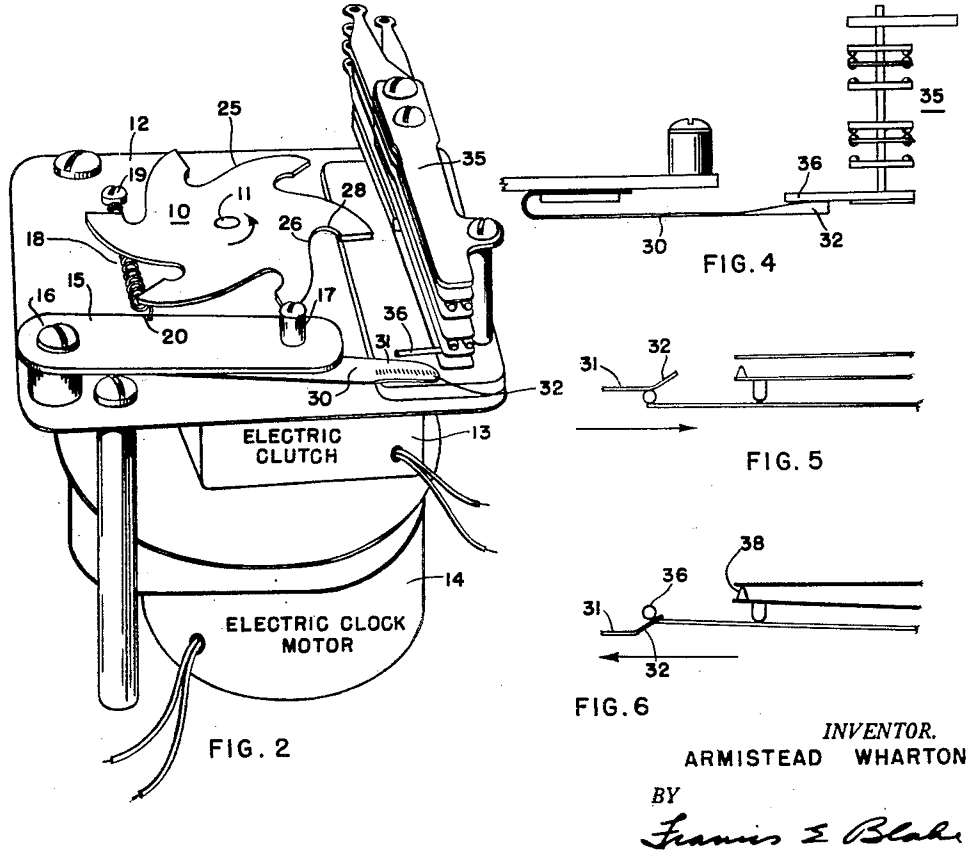
Fig. 2 is a side perspective view.
Figure 7:
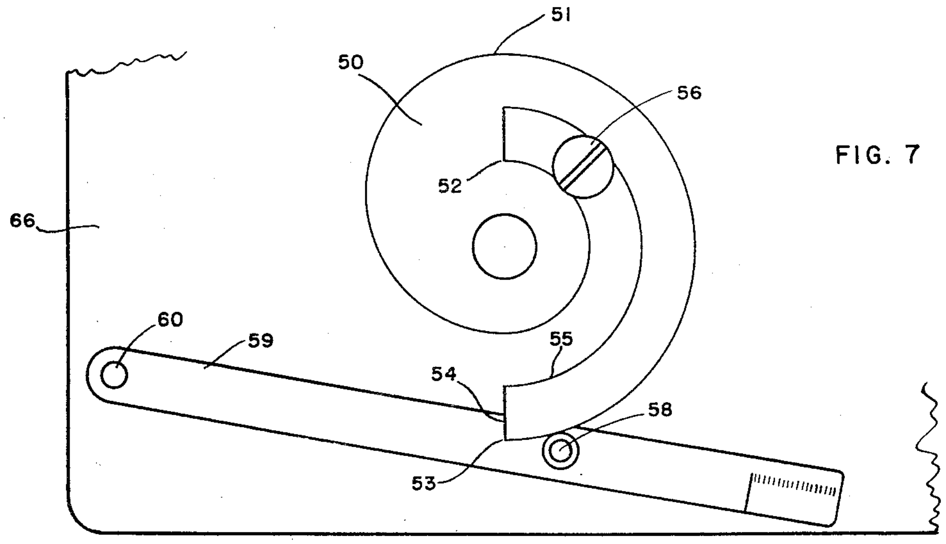
Figure 8:
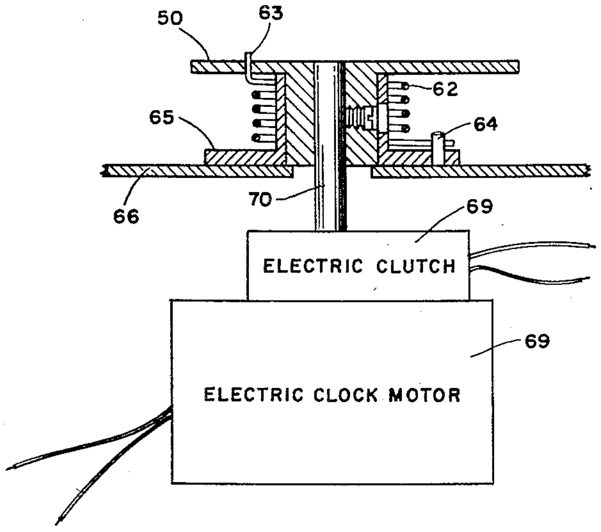

Figs. 3 and 4 are fragmentary side views as seen to the right of the plan view of Fig. 1, with the spring switch operating blade shown to be overriding the switch operating bar in Fig. 3, and with the spring blade shown to be underriding the switch operating bar in Fig. 4, Fig. 5 is a fragmentary end view as seen to the right of Fig. 3, Fig. 6 is a fragmentary end view as seen to the right of Fig. 4, Fig. 7 is a diagrammatic plan view of a modified form of the invention, and Fig. 8 is a fragmentary vertical section of the modified form of the invention as shown in Fig. 7.

Referring to Figs. 1 and 2 of the drawings, the timing cam 10 is shown to be secured to the shaft 11, rotatably journaled on the frame member 12. The lower end of the cam shaft 11 may be connected by an electric clutch generally shown at 13 to be driven by the clock train, generally shown as an electric clock motor 14. When the clutch 13 is engaged, the timing cam 10 will be moved in a first direction, i. e., rotated in a counterclockwise direction, as shown by the arrow, it being understood that the clock train 14 is continuously operated.

A lever arm 15 is pivotally journaled at 16 to the frame member 12 and it will be seen that the lever arm is positioned approximately tangential to the periphery of the timing cam 10. The free end of the lever arm 15 is adapted to engage the periphery of the timing cam 10 as by means of a cam follower roller 17. A coil spring 18 is secured at one end 19 to the frame 12 and at the other end 20 to the lever arm 15 in a manner to resiliently urge the free end of lever arm 15, as represented by cam follower 17, into engagement with the periphery of the timing cam 10.

As shown in Figs. 1 and 2, the timing cam 10 is provided with a generally ratchet shaped periphery including first peripheral sections 25 gradually diverging from an inner reference or starting position 26 in the direction opposite to the first direction of rotation of the timing cam, as provided by the operation of the clock motor 14. The outer end of a first cam section 25 is joined with a second peripheral section 27 and extending inwards towards the axis of the cam to connect with the inner end 26 of the peripheral section 25 of a succeeding cam portion. While the timing device of the invention is shown to be provided with a timing cam having six ratchet shaped cam portions, it should be obvious that any number of cam portions, including a single cam portion, may be employed and that the speed of rotation of the cam in the first direction by the clock motor, together with the number of identical cam portions provided, will determine the frequency of the occurrence of characteristic movements of the lever arm 15 to be presently described.

When the cam 10 is rotated in the first or counterclockwise direction, the lever arm 15 will be moved in a first direction outwardly from the axis of the cam as the cam follower 17 engages the first periphery section 25. When the timing cam 10 has been rotated to the position shown in Fig. 2 of the drawings, the cam follower 17 and lever arm 15 will be moved to the extreme outward position away from the axis of the cam. Thereafter, a continued rotation of the timing cam will enable the cam follower 17 to engage the second peripheral section 27 which extends inward along a radius of the cam to cause the lever arm 15 and cam follower 17, under the influence of the spring 18, to move rapidly inwards in a second direction towards the axis of the cam thereby providing a characteristic mechanical movement of the lever arm. The pivot 16 of the arm 15 may be adjustable, if desired, which will enable the speed of movement of the arm 15 inwards in a second direction to be controlled. In other words, the arc of contact for the follower 17 with relation to the peripheral surface 27 may be varied by a change in the position of the pivot point 16 relative to the cam periphery to thus control the speed of movement in the second direction by the arm 15.

At any instance when the clock motor 14 is declutched from the timing cam 10 by the clutch 13, the cam follower 17 engaging any one of the gradually sloping peripheral sections 25 or 27 will rotate the timing cam backwards in a second or clockwise direction until the cam follower 17 is received at the conjunction 26 of the inner ends of the peripheral sections 25 and 27. Thus, in such manner, the timing cam 10 is instantly resettable to a known starting position for a subsequent timing operation simply by operating the electric clutch 13 to declutch the clock train from the timing cam.

In the event that a longer time interval between the start of a timing operation and the first occurrence of a characteristic inward movement of the lever arm 15 is desired, the conjunction 26 of the inner ends of the peripheral sections 25 and 27 may be indented, as shown at 28. This will enable the timing cam 10 to be rotated clockwise by the camming action of the cam follower 17 on the peripheral section 25 to an initial starting position with the cam follower 17 received in the indentation 28. Therefore, when the timing cam is thereafter rotated in the counterclockwise direction for the beginning of a subsequent timing operation, a somewhat longer first peripheral section 25 must be traversed before a second peripheral section 27 will be reached as compared with subsequent traversals of first peripheral sections 25.

The momentary characteristic mechanical movement of the lever arm 15 in the second direction towards the axis of the timing cam 10 may be caused to operate electrical contacts to provide a momentary electrical impulse at such time. As shown more clearly in Figs. 3–6, together with Figs. 1 and 2, the free end of the lever arm 15 may be provided with a resilient finger or blade 30 having a cam shaped end comprised of a flat blade portion 31 and an upwardly bent lip or cam portion 32. Electrical contact means comprising a plurality of contact springs is shown generally at 35 to be mounted on the top of the frame member 12 and such contact springs are of conventional design except that the movable contacts are provided with an operating bar 36 extending generally parallel to the face of the frame member 12. This arrangement is such that a movement of the operating bar 36 upward from the face of the frame 12 will cause a corresponding movement of certain movable contact springs in the assembly 35 to thereby close electrical connections with certain other stationary contacts in the contact assembly 35.

As the lever arm 15 is moved outwards from the axis of the cam, the upwardly bent portion of the spring plate 30 will override the operating bar 36, as shown by Figs. 3 and 5 of the drawings, and will finally reach a position as shown by Fig. 2 of the drawings when the lever arm 15 is in its extreme outward position. A continued rotation of the timing cam will thereafter cause the lever arm 15 to move rapidly in a second direction towards the axis of the timing cam 10 and the flat plate portion 31 of the spring arm 30 will pass beneath or underride the switch operating bar 36 and the upwardly bent end 32 will engage the operating bar 36, as shown in Figs. 4 and 6 of the drawings, to move such bar upwardly from the face of the frame member 12 and close the switch contacts as shown at 38. Thus the characteristic momentary mechanical movement of the lever arm 15 in the second direction towards the axis of the timing cam may be effective to produce a very short electrical pulse during the momentary closure of the switch contacts.

It should be understood that the duration of the first time interval from the start of the timing operation when the electric clutch 13 is first operated to connect the clock motor 14 to drive the timing cam 10 may be arbitrarily determined in accordance with the size and configuration of the indented portion 28 at the conjunction 26 of the inner ends of the peripheral sections 25 and 27. When the indented portion 28 is made very large to underlie a considerable portion of the outer end of a first peripheral section 25, a greater first time interval will be provided as should be readily understood.

For example, referring to Figs. 7 and 8 of the drawings in which a modified form of the invention is shown, the timing cam 50 may comprise a single camming portion. The camming portion includes a first cam section 51 gradually departing from the reference position 52 to the point 53 at which it is joined to a second cam section 54. The cam section 54 is provided with a substantially arcuate slot 55 at the end of which the cam section 54 joins the first mentioned cam section 51 at the reference point 52. A set screw 56 is adjustably positioned within the slot 55 to provide an adjustment of the inner end of the slot that is effective to engage the cam follower 58. The cam follower 58 is mounted on the cam follower lever arm 59 pivoted at 60 to a framework on which both the cam follower arm 59 and the timing cam 50 are supported. The cam follower arm 59 cooperates with the timing cam 50 in a manner similar to that described in connection with the form of the invention shown in Figs. 1 and 2 of the drawings.

The first cam section 51 of the timing cam 50 has a somewhat less slope angle than that as described in connection with the form of the invention shown in Figs. 1 and 2. Therefore, the camming action of the cam follower 58 on the cam section 51 may not be sufficiently strong to assure a movement of the timing cam 50 in the clockwise or reset direction whenever the timing cam is declutched from the driving clock train. To further aid in returning the timing cam 50 to the reset position with the cam follower 58 engaged in the slot 55 and abutting the set screw 56, a return spring 62 as shown in Fig. 8 of the drawings may be provided. The return spring 62 is anchored at one end 63 to the timing cam 50 and its other end engages the pin 64 of the clutch friction plate 65 which is freely rotatable about the hub of the timing cam 50. The clutch friction plate 65 drags against the surface 66 of the frame member upon which the cam 50 and the cam follower arm 59 are mounted. Whenever the clock motor 68 is connected through the electrically controlled clutch 69 to drive the cam shaft 70 and cam 50, the return spring 62 will be coiled and energy stored in the spring to an amount sufficient to cause the friction clutch plate 65 to drag against the frame surface 66. Thereafter, should the electric clutch 69 be operated to declutch motor 68 from the cam shaft 70, the return spring 62 will be effective to aid in returning the cam 50 in the clockwise or reset direction until the cam follower 58 engages the set screw 56 in the arcuate slot 55.

It should be apparent that the form of the invention described above in connection with Figs. 7 and 8 of the drawings, will provide a considerably greater first time interval from the start of the timing operation to the time that the cam follower arm 59 and cam follower 58 move rapidly inwards toward the axis of the timing cam 50. Thereafter the time intervals between similar occurrences of the movement of the cam follower arm 59 toward the cam axis will be equal and will be of less duration than the first time interval which was determined by the starting position as provided by the adjustable set screw 56.

Various modifications may be made wtihin the spirit of the invention and the scope of the appended claims.

What is claimed is:

1. In a timing device, a timing cam having a camming portion comprising a first section of predetermined extent which gradually departs from a reference position and a second section joining the ends of said first section, cam follower means arranged to engage said sections during movement of said cam, first means for moving said cam in one direction to cause said follower means to move in a predetermined pattern, and second means including said follower means for causing said cam to move in a different direction to a reset position distinct from the reference position, said second means being effective only when said first means is ineffective.

2. In a timing device, a timing cam having a plurality of similar camming portions each comprising a first section of predetermined extent which gradually departs from a reference position and a second section joining the ends of successive first sections, cam follower means arranged to engage said sections during movement of said cam, first means for moving said cam in one direction to cause said follower means to move in a predetermined pattern, and second means including said follower means for causing said cam to move in a different direction to a reset position distinct from the reference position, said follower engaging the conjunction of a first and second section at the reference position, said second means being effective only when said first means is ineffective.

3. The invention of claim 1 in which the second section of the timing cam is provided with an indentation extending backward to underlie a portion of the preceding first section at the reference position joining first and second sections, said follower means engaging said indentation at the reset position.

4. The invention of claim 2 in which each second section of the timing cam is provided with an indentation extending backward to underlie the preceding first section at the reference position joining first and second sections, said follower means engaging said indentation at the reset position.

5. In a timing device, a timing cam having a camming portion comprising a first section of predetermined extent which gradually departs from a reference position and a second section joining the ends of said first section, cam follower means arranged to engage said sections during movement of said cam, first means for moving said cam in one direction to cause said follower means to move in a predetermined pattern including a first direction as said follower engages said first section and a second direction as said follower engages said second section, second means including said follower means for causing said cam to move in a different direction to a reset position, said second means being effective only when said first means is ineffective, electric contact means, and operating means carried by said follower means to momentarily operate said contact means only when said follower is moving in the second direction.

6. In a timing device, a timing cam having a plurality of similar camming portions each comprising a first section of predetermined extent which gradually departs from a reference position and a second section joining the ends of successive first sections, cam follower means arranged to engage said sections during movement of said cam, first means for moving said cam in one direction to cause said follower means to move in a predetermined pattern including a first direction as said follower engages said first section and a second direction as said follower engages said second section, second means including said follower means for causing said cam to move in a different direction to a reset position with said follower engaging the conjunction of a first and second section at the reference position, said second means being effective only when said first means is ineffective, electric contact means, and operating means carried by said follower means to momentarily operate said contact means only when said follower is moving in the second direction.

7. The invention of claim 5 in which the second section of the timing cam is provided with an indentation extending backward to underlie a portion of the preceding first section at the reference position joining first and second sections.

8. The invention of claim 6 in which each second section of the timing cam is provided with an indentation extending backward to underlie the preceding first section at the reference position joining first and second sections.

9. The invention of claim 5 in which said electric contact means is comprised of a plurality of contact springs, at least one contact spring being movable to electrically connect with at least one other contact spring, an operating bar connected to the movable contact springs, said operating means carried by said follower means being comprised of a resilient finger having a cam shaped end overriding said bar when said follower means is moving in the first direction and underriding said bar when said follower means is moving in the second direction, the cam shaped end of said finger when underriding said bar being effective to momentarily move said bar and the movable contact springs to electrically connect with the other contact springs during the movement of the follower means in the second direction.

10. The invention of claim 6 in which said electric contact means is comprised of a plurality of contact springs, at least one contact spring being movable to electrically connect with at least one other contact spring, an operating bar connected to the movable contact springs, said operating means carried by said follower means being comprised of a resilient finger having a cam shaped end overriding said bar when said follower means is moving in the first direction and underriding said bar when said follower means is moving in the second direction, the cam shaped end of said finger when underriding said bar being effective to momentarily move said bar and the movable contact springs to electrically connect with the other contact springs during the movement of the follower means in the second direction.

11. In a timing device, a timing cam having a camming portion comprising a first section of predetermined extent which gradually departs from a reference position and a second section joining the ends of said first section, said second section having an indentation extending backward to underlie a portion of the preceding first section at the reference position joining first and second sections, cam follower means for moving said cam in one direction to cause said follower means to move in a predetermined pattern including a first direction as said follower engages said first section and a second direction as said follower engages said second section, second means including said follower means for causing said cam to move in a different direction to a reset position, said second means being effective only when said first means is ineffective, electric contact means comprising a plurality of contact springs, at least one contact spring being movable to electrically connect with at least one other contact spring, an operating bar connected to the movable contact springs, operating means carried by said follower means and comprising a resilient finger having a cam shaped end overriding said bar when said follower means is moving in the first direction and underriding said bar when said follower means is moving in the second direction, the cam shaped end of said finger when underriding said bar being effective to momentarily move said bar and the movable contact springs to electrically connect with the other contact springs during the movement of the follower means in the second direction.

12. In a timing device, a timing cam having a plurality of camming portions each comprising a first section of predetermined extent which gradually departs from a reference position and a second section joining the ends of successive first sections, each of said second sections having an indentation extending backward to underlie a portion of the preceding first section at the reference position joining first and second sections, cam follower means for moving said cam in one direction to cause said follower means to move in a predetermined pattern including a first direction as said follower engages one of said first sections and a second direction as said follower engages one of said second sections, second means including said follower means for causing said cam to move in a different direction to a reset position with said follower engaging the conjunction of a first and second section at the reference position, said second means being effective only when said first means is ineffective, electric contact means comprising a plurality of contact springs, at least one contact spring being movable to electrically connect with at least one other contact spring, an operating bar connected to the movable contact springs, operating means carried by said follower means and comprising a resilient finger having a cam shaped end overriding said bar when said follower means is moving in the first direction and underriding said bar when said follower means is moving in the second direction, the cam shaped end of said finger when underriding said bar being effective to momentarily move said bar and the movable contact springs to electrically connect with the other contact springs during the movement of the follower means in the second direction.

13. A timing device for producing a characteristic momentary mechanical movement after regularly recurring time intervals comprising, a timing cam, a clock train, a clutch adapted to be operated to connect said timing cam to be rotated in a first direction by said clock train, said timing cam having a generally ratchet shaped periphery including a first section gradually diverging outward from an inner reference position in a direction opposite to the first direction of rotation of said cam, the outer end of said first section connecting with a second section extending inwards towards the cam axis to connect with the inner end of said first section at the reference position, cam follower means positioned to engage the periphery of said cam, and means to resiliently urge said cam follower means to engage the periphery of said cam at all times during the rotation of said cam whereby said follower means is characteristically moved after regularly recurring intervals as said cam follower means engages said second section during rotation of said cam by said clock train in the first direction, and said cam is rotated backwards in a second direction by the camming action of said cam follower means on said first cam section to a reset starting position with the cam follower means engaging the conjunction of first and second sections at all times when said cam is declutched from said clock train.

14. A timing device for producing a characteristic momentary mechanical movement after regularly recurring time intervals comprising, a timing cam, a clock train, a clutch adapted to be operated to connect said timing cam to be rotated in a first direction by said clock train, said timing cam having a generally ratchet shaped periphery including a first section gradually diverging outward from an inner reference position in a direction opposite to the first direction of rotation of said cam, the outer end of said first section connecting with a second section extending inwards toward the cam axis, the inner end of said second section having an indentation extending backward and underlying a portion of the outer end of said first section to connect with the inner end of said first section at the reference position, cam follower means positioned to engage the periphery of said cam, and means to resiliently urge said cam follower means to engage the periphery of said cam at all times during the rotation of said cam whereby said follower means is characteristically moved after regularly recurring intervals as said cam follower means engages said second section during rotation of said cam by said clock train in the first direction, and said cam is rotated backwards in a second direction by the camming action of said cam follower means on said first cam section to a reset starting position with the cam follower means received in said indentation at all times when said cam is declutched from said clock train.

15. A timing device for producing a characteristic momentary mechanical movement after regularly recurring time intervals comprising, a timing cam, a clock train, a clutch adapted to be operated to connect said timing cam to be rotated in a first direction by said clock train, said timing cam having a generally ratchet shaped periphery including a plurality of cam portions, each cam portion having first and second sections, the first section gradually diverging outward from an inner reference position in a direction opposite to the first direction of rotation of said cam, the outer end of said first section connecting with the second section extending inwards towards the cam axis to connect with the inner end of a succeeding first section at the reference position, cam follower means positioned to engage the periphery of said cam, and means to resiliently urge said cam follower means to engage the periphery of said cam at all times during the rotation of said cam whereby said follower means is characteristically moved after regularly recurring intervals as said cam follower means engages each of said second sections during rotation of said cam by said clock train in the first direction, and said cam is rotated backwards in a second direction by the camming action of said cam follower means on any of said first cam sections to a reset starting position with the cam follower means engaging the conjunction of first and second sections at all times when said cam is declutched from said clock train.

16. A timing device for producing a characteristic momentary mechanical movement after regularly recurring time intervals comprising, a timing cam, a clock train, a clutch adapted to be operated to connect said timing cam to be rotated in a first direction by said clock train, said timing cam having a generally ratchet shaped periphery including a plurality of cam portions, each cam portion having first and second sections, the first section gradually diverging outward from an inner reference position in a direction opposite to the first direction of rotation of said cam, the outer end of each first section connecting with the second section extending inwards towards the cam axis, the inner end of each second section having a peripheral indentation extending backward and underlying a portion of the outer end of the first section to connect with the inner end of a succeeding first section at the reference position, cam follower means positioned to engage the periphery of said cam, and means to resiliently urge said cam follower means to engage the periphery of said cam at all times during the rotation of said cam whereby said follower means is characteristically moved after regularly recurring intervals as said cam follower means engages each of said second sections during rotation of said cam by said clock train in the first direction, and said cam is rotated backwards in a second direction by the camming action of said cam follower means on said first cam section to a reset starting position with the cam follower means received in one of said indentations at all times when said cam is declutched from said clock train.

17. In a timing device, a timing cam having a camming portion comprising at least one section of predetermined extent which gradually departs from a reference position, a section including a first portion in proximity to said reference position and a second portion distal to said reference position, a first portion of a section underlying a second portion of a section and being separated therefrom by an indentation in said cam, cam follower means arranged to engage said portions of a section during movement of said cam, first means for movin said cam in one direction to cause said follower means to move to a reset position of said cam with said follower means engaging an indentation at the reference position, and second means for moving said cam from the reset position in a different direction to cause said follower means to move out of an indentation in engagement with a first portion of a section and thereafter engage a second portion of a section without again engaging a first portion thereof as long as said cam continues to move in said different direction.

18. In a timing device, a timing cam having a camming portion comprising a plurality of sections each of predetermined extent which gradually depart from a reference position, each section including a first portion in proximity to said reference position and a second portion distal to said reference position, a first portion of one section underlying a second portion of another section and being separated therefrom by an indentation in said cam, cam follower means arranged to engage said portions of each section during movement of said cam, first means for moving said cam in one direction to cause said follower means to move to a reset position of said cam with said follower means engaging an indentation at the reference position, and second means for moving said cam from the reset position in a different direction to cause said follower means to move out of an indentation in engagement with a first portion of a section and thereafter engage a second portion of said sections without again engaging a first portion thereof as long as said cam continues to move in said different direction.

References Cited in the file of this patent

UNITED STATES PATENTS

| | | |
|---|---|---|
| 1,179,512 | Fenning | Apr. 18, 1916 |
| 1,583,760 | Roney | May 4, 1926 |
| 2,094,060 | Busch | Sept. 28, 1937 |
| 2,504,002 | Crum | Apr. 11, 1950 |
| 2,585,839 | Rasini | Feb. 12, 1952 |